(12) United States Patent
Vanderwalker et al.

(10) Patent No.: US 10,436,180 B2
(45) Date of Patent: Oct. 8, 2019

(54) APPARATUS AND METHOD FOR REMOVING OR INSTALLING A BEARING UNIT IN A WIND TURBINE BEDPLATE WITH AN ADJUSTABLE BEARING SUPPORT

(71) Applicant: General Electric Company, Schenectady, NY (US)

(72) Inventors: Darrick Adam Vanderwalker, Pattersonville, NY (US); Waylon James Esser, Canova, SD (US); Hunter Ryan Anderson, Muskegon, MI (US)

(73) Assignee: General Electric Company, Schenectady, NY (US)

( * ) Notice: Subject to any disclaimer, the term of this patent is extended or adjusted under 35 U.S.C. 154(b) by 236 days.

(21) Appl. No.: 15/498,805

(22) Filed: Apr. 27, 2017

(65) Prior Publication Data

US 2018/0313332 A1      Nov. 1, 2018

(51) Int. Cl.
| | | |
|---|---|---|
| *F03D 13/10* | (2016.01) | |
| *F03D 80/70* | (2016.01) | |
| *B23P 6/00* | (2006.01) | |

(52) U.S. Cl.
CPC .......... *F03D 13/10* (2016.05); *F03D 80/70* (2016.05); *B23P 6/00* (2013.01); *F05B 2230/61* (2013.01); *F05B 2230/70* (2013.01); *F05B 2240/50* (2013.01); *Y02E 10/722* (2013.01); *Y10T 29/49696* (2015.01); *Y10T 29/49698* (2015.01); *Y10T 29/53852* (2015.01); *Y10T 29/53974* (2015.01)

(58) Field of Classification Search
CPC .......... F03D 13/00; F03D 13/10; F03D 80/50; Y10T 29/49696; Y10T 29/49698; Y10T 29/53852; Y10T 29/53857; Y10T 29/53861; Y10T 29/53887; Y10T 29/53874; Y10T 29/53878; Y10T 29/53883; Y10T 29/53891; Y10T 29/53961; Y10T 29/53974; Y10T 29/5387
USPC .............................................. 269/58, 60, 61
See application file for complete search history.

(56) References Cited

U.S. PATENT DOCUMENTS

| | | | | |
|---|---|---|---|---|
| 1,481,503 | A * | 1/1924 | Carswell .............. | B25H 1/0007 248/172 |
| 2,188,433 | A * | 1/1940 | Friese ...................... | B23Q 3/00 269/242 |
| 3,403,434 | A * | 10/1968 | Calabro ................ | B25B 27/064 29/252 |

(Continued)

FOREIGN PATENT DOCUMENTS

JP        2001-62748 A      3/2001

OTHER PUBLICATIONS

International Search Report and Written Opinion issued in connection with corresponding PCT Application No. PCT/US2018/29703 dated Aug. 2, 2018.

*Primary Examiner* — Jason L Vaughan
(74) *Attorney, Agent, or Firm* — Dority & Manning, P.A.

(57) ABSTRACT

An apparatus and method for removing or installing a bearing unit at the downwind end of the bedplate in wind turbine uses a frame erected at the downwind end of the bedplate. The frame has cradle members located such that the bearing unit can be slid out of the bedplate and supported on the cradle members, or supported on the cradle members and pushed into the bedplate.

14 Claims, 5 Drawing Sheets

(56) References Cited

U.S. PATENT DOCUMENTS

| | | | | |
|---|---|---|---|---|
| 3,480,158 A * | 11/1969 | Pandjiris | ............ | B23K 37/0538 228/48 |
| 3,567,044 A * | 3/1971 | Travis | ................... | B23P 19/024 254/105 |
| 3,675,915 A * | 7/1972 | Vigus | ....................... | B23Q 1/76 269/58 |
| 3,790,356 A * | 2/1974 | Bergling | .............. | B63H 23/321 248/351 |
| 4,192,054 A | 3/1980 | Webb | | |
| 4,323,398 A * | 4/1982 | Simon | ..................... | F28G 15/02 134/18 |
| 4,485,542 A * | 12/1984 | Vasoll | ................... | B23P 19/084 29/252 |
| 4,659,072 A * | 4/1987 | De La Rosa | .......... | D04B 37/00 269/17 |
| 4,869,638 A * | 9/1989 | Krajicek | ............... | B23P 19/024 414/745.3 |
| 5,533,556 A * | 7/1996 | Whitney | ............... | B23Q 9/0042 144/144.1 |
| 5,863,034 A * | 1/1999 | Vauter | .................... | B23K 37/04 269/17 |
| 7,107,677 B2 * | 9/2006 | Lyons | ..................... | F04B 15/08 269/289 MR |
| 7,944,079 B1 * | 5/2011 | Signore | ................... | F03D 15/00 290/55 |
| 8,108,997 B2 | 2/2012 | Weaver et al. | | |
| 8,127,417 B1 | 3/2012 | Butler et al. | | |
| 8,245,856 B1 * | 8/2012 | Pappin | .................... | A63H 17/44 211/13.1 |
| 8,696,302 B2 | 4/2014 | Stiesdal | | |
| 8,814,512 B2 * | 8/2014 | Skaustein | ............. | F01D 25/285 29/402.01 |
| 8,833,776 B2 * | 9/2014 | Boulanger | ................ | B66F 9/06 280/35 |
| 9,188,007 B2 * | 11/2015 | Edwards | ................. | F01D 25/16 |
| 9,318,925 B2 | 4/2016 | Lemma | | |
| 9,371,822 B2 | 6/2016 | Demtroder | | |
| 9,612,063 B2 * | 4/2017 | Reich | .................... | B23P 19/024 |
| 9,624,902 B2 * | 4/2017 | Westergaard | ......... | F03D 1/0666 |
| 9,638,106 B2 * | 5/2017 | Muller | .................... | B25B 27/06 |
| 9,744,634 B2 * | 8/2017 | Plank | ..................... | B23Q 3/104 |
| 2007/0193014 A1 * | 8/2007 | Henley | ................. | B23P 19/022 29/428 |
| 2007/0200103 A1 * | 8/2007 | Viladomiu i Guarro | ..................... | B66C 23/207 254/334 |
| 2010/0275442 A1 | 11/2010 | Ohl, Jr. | | |
| 2011/0131781 A1 * | 6/2011 | Smith | .................... | B23B 29/02 29/281.1 |
| 2011/0162194 A1 * | 7/2011 | Sugimoto | ................ | B66C 9/02 29/592.1 |
| 2011/0272872 A1 * | 11/2011 | Stadtfeld | ................ | B23F 23/06 269/61 |
| 2012/0073118 A1 * | 3/2012 | Bywaters | ............. | H02K 7/1838 29/596 |
| 2012/0073134 A1 * | 3/2012 | Bywaters | ............. | H02K 7/1838 29/889.1 |
| 2012/0112463 A1 * | 5/2012 | Gelmini | ............... | F03D 80/70 290/55 |
| 2012/0131786 A1 * | 5/2012 | Neumann | ............... | F03D 15/00 29/464 |
| 2012/0141292 A1 * | 6/2012 | Signore | ................... | B66C 1/108 416/244 R |
| 2014/0373353 A1 * | 12/2014 | Westergaard | ........... | F03D 80/70 29/889 |
| 2015/0026979 A1 * | 1/2015 | Muller | .................... | B25B 27/06 29/889.1 |

* cited by examiner

APPARATUS AND METHOD FOR REMOVING OR INSTALLING A BEARING UNIT IN A WIND TURBINE BEDPLATE WITH AN ADJUSTABLE BEARING SUPPORT

FIELD OF THE INVENTION

The present disclosure relates generally to wind turbines, and more particularly to an apparatus and method for removing and/or installing a bearing unit in a bedplate atop a wind turbine tower in the field.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. In many wind turbines, the gearbox is mounted to the bedplate via one or more torque supports or arms. The rotor blades capture kinetic energy of wind using known airfoil principles and transmit the kinetic energy in the form of rotational energy so as to turn a main shaft coupling the rotor blades to the gearbox, or if a gearbox is not used, directly to the generator. The generator then converts the mechanical energy to electrical energy that may be deployed to a utility grid.

More specifically, the majority of commercially available wind turbines utilize multi-stage geared drivetrains to connect the turbine blades to an electrical generator. The wind turns the turbine blades, which spin a low speed shaft, i.e. the main shaft. The main shaft is coupled to an input shaft of a gearbox, which has a higher speed output shaft connected to a generator. Thus, the geared drivetrain aims to increase the velocity of the mechanical motion. Further, the gearbox and the generator are typically supported by one or more bearings and mounted to the bedplate via one or more torque arms or supports.

Over time, the main shaft and associated bearings may become worn and/or damaged due to loads and forces from the wind acting on the wind turbine components. Unfortunately, repair of the main shaft and/or the main bearing assembly often requires the turbine head (machine head) to be removed from atop the nacelle and transported to a factory wherein the bedplate is stood up vertically to remove the main shaft and bearing assembly, which is a very time-consuming and expensive procedure.

U.S. Pat. No. 8,696,302 discloses a method for repairing or replacing a main bearing on a wind turbine without removing the rotor and main shaft. This method is not suited for wind turbine designs wherein bearing replacement or repair requires removal of the rotor and main shaft.

U.S. Pat. No. 8,108,997 discloses a method for stabilizing the main shaft within the bedplate on a single bearing unit to repair or replace the gear box. This method is not suited for a procedure that requires removal of the rotor and main shaft to replace or repair the main bearing assembly.

To date, there has been no viable method for repairing, replacing, or upgrading a dual main bearing unit seated in a bedplate in the field, wherein the procedure may or may not require removal of the rotor and main shaft from the bedplate.

Thus, the industry is in need of new and improved systems and methods for repairing, replacing, or upgrading a main shaft bearing seated in the bedplate of the wind turbine in the field, wherein the bedplate remains installed in a horizontal position atop the tower, or is removed from the tower in the field.

BRIEF DESCRIPTION OF THE INVENTION

Aspects and advantages of the invention will be set forth in part in the following description, or may be obvious from the description, or may be learned through practice of the invention.

In one aspect, the present invention is directed to an apparatus and method for removing or installing a bearing unit at a downwind end of a bedplate in the field, wherein the main shaft may or may not have been previously pulled from the bedplate.

In this regard, an embodiment of an apparatus for the stated purpose comprises a frame fixable to a downwind end of the bedplate adjacent to the bearing unit. Cradle members are mounted on the frame at a location such that the bearing unit can be slid out of the bedplate and supported on the cradle members, or slid from the cradle members into the bedplate. The cradle members are adjustable on the frame in a transverse and vertical direction to accommodate bearing units of varying size.

The frame can take on various configurations. For example, in one embodiment, the frame has a base member mounted on vertical rods, with the cradle members adjustable in the transverse direction along the base member, and the base member adjustable in the vertical direction along the rods.

The frame may further include a top cross member spanning between the rods and fixable to the bedplate via spacers extending transversely from a back side of the top cross member. These spacers may include a cut-out section that accommodates a flange on the bedplate that surrounds the bearing unit such that the spacers bear against the bedplate and the flange when the top cross member is bolted to the bedplate with bolts through the spacers.

In certain embodiments of the apparatus, the base member includes a bottom beam that spans between the rods, the beam adjustable in a vertical direction along the rods via nuts threaded onto the rods.

The cradle members may include various deigns. For example, in one embodiment the cradle members may be designed into a continuous curved member that is fixed to a base member. This curved member may be, for example, a rigid component, or a non-rigid sling member. In a particular embodiment described, herein the cradle members are defined by separate components that are slidable (and thus adjustable) along the base member. Each individual cradle member can have various designs or configurations. For example, in one embodiment, each cradle member may include an upper cradle section having a shape to engage against an outer circular ring of the bearing unit, and a lower cradle base that is slidable along the base member.

The cradle members may further include a locking mechanism configured to lock the cradle member at a fixed position along the base member. In certain embodiments, this locking mechanism may also serve to fix the cradle member to the bedplate at a fixed position, thereby also locking the cradle member at the fixed position relative to the base member. For example, the locking mechanism may include a bolt that extends through a nut fixed to the cradle member, the bolt having a length so as to bear against or extend into a threaded hole in the bedplate or a flange attached to the bedplate around the bearing unit.

An aspect of the apparatus includes the frame being fixable to the bedplate at two upper locations at opposite sides of the bearing unit, and at two lower locations at opposite sides of the bearing unit. For example, the cradle members may be adjustable along a base member of the frame and fixable to the bedplate at the two lower locations. For the two upper locations, the frame may include a top cross member configured with spacers, the top cross member boltable to the bedplate through the spacers.

The present invention also encompasses various method embodiments for removing or installing a bearing unit at a downwind end of a in the field, wherein the main shaft may or may not have been previously removed from the bedplate. The method includes erecting a frame at a downwind end of the bedplate adjacent to the bearing unit, and fixing the frame to the bedplate. The method includes adjusting cradle members on the frame at a location such that the bearing unit can be slid out of the bedplate and supported on the cradle members, or supported on the cradle members and pushed into the bedplate. The method finally includes sliding the bearing unit out of the bedplate and onto the cradle members, or sliding the bearing unit from the cradle members into the bedplate.

The functional aspects of the apparatus discussed above are applicable to the method embodiments.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present invention is directed to apparatus and methods for installation and/or removal of the downwind end bearing unit from the wind turbine bedplate in the field, wherein the nacelle (machine head) remains atop the tower and the main shaft may or may not have been pulled from the bedplate. The methods provide significant commercial advantages in terms of time and expense for maintenance procedures that may require removal of the main shaft from the machine head, such as repair/replacement of the bearing unit fitted in the bedplate. Aspects of the present inventive methods are described below with reference to the drawings.

Figure 1:
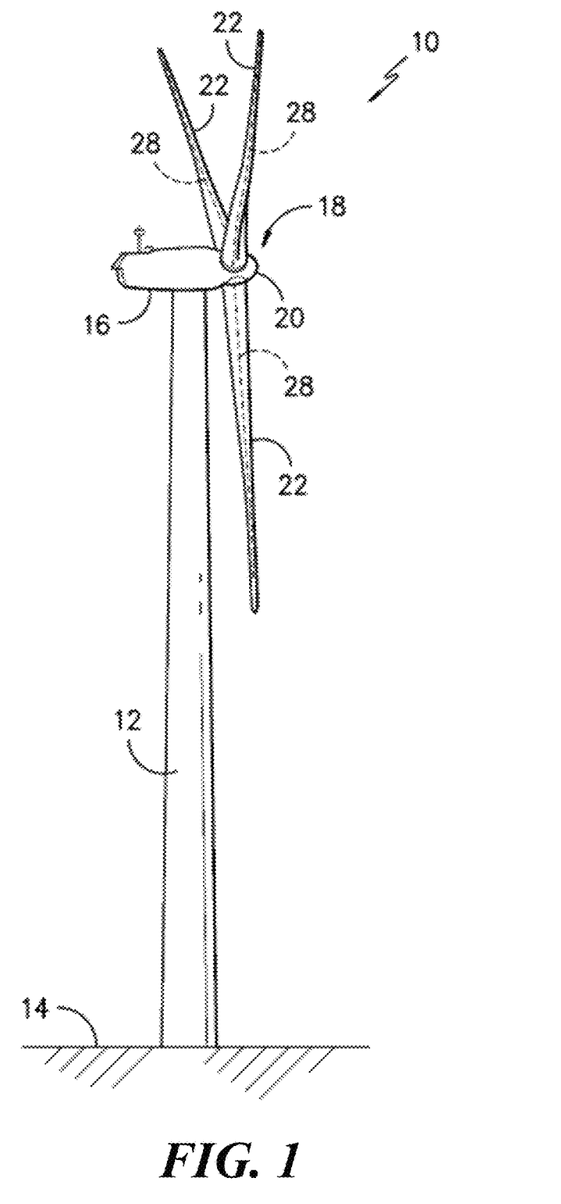
FIG. 1 is a perspective view of a conventional wind turbine.

Referring now to the drawings, FIG. 1 illustrates a perspective view of one embodiment of a wind turbine 10 relevant to the present discussion. As shown, the wind turbine 10 generally includes a tower 12 extending from a support surface 14, a nacelle 16 (also referred to as a machine head) mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components thereof. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals and/or performing the various method steps as described herein.

Figure 2:
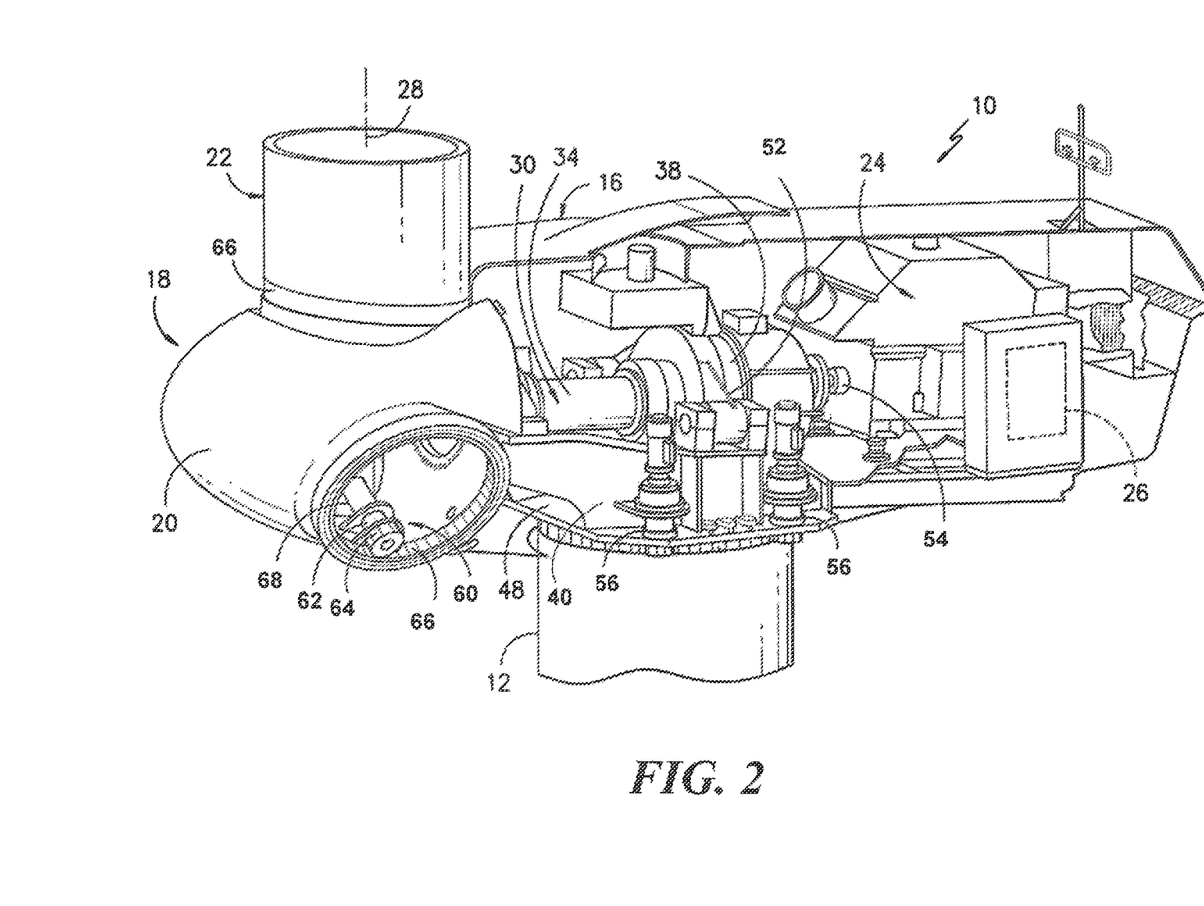
FIG. 2 is a perspective view of a simplified, internal view of one embodiment of a nacelle of a conventional wind turbine.

Referring now to FIG. 2, a simplified, internal view of one embodiment of the nacelle 16 shown in FIG. 1 is illustrated, particularly illustrating the drivetrain assembly 30. As shown, the drivetrain assembly 30 includes the generator 24, which may be coupled to the rotor 18 for producing electrical power from the rotational energy generated by the rotor 18. The rotor 18 includes a main shaft 34 coupled to the hub 20 via a rotor flange 36 for rotation therewith. The main shaft 34, in turn, is rotatably coupled to a generator shaft 54 of the generator 24 through a gearbox 38 connected to a bedplate support frame 40 by torque support arms 52. The bedplate 40 is depicted in the figures, for illustrative purposes, as a single-piece bedplate made from one complete casting with bores machined therein where the bearings are seated. The present invention may also have utility with a two-piece bedplate that is split horizontally, particularly if the invention offers a time and expense advantage as compared to unbolting the split bedplate and lifting the main shaft and bearings from the bottom half of the bedplate.

Figure 3:
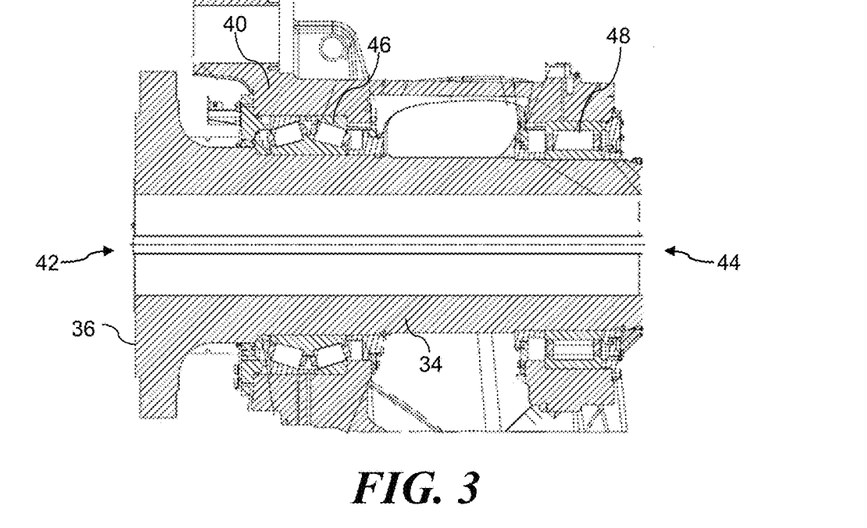
FIG. 3 is a perspective view of one embodiment of a drivetrain assembly particularly illustrating the main shaft, upwind end main bearing assembly, and downwind end bearing unit fixed in the bedplate.

Referring to FIG. 3, the main shaft 34 is supported by one or more bearing assemblies 46, 48 in the bedplate 40. For example, as shown, a forward "upwind" end 42 of the shaft 36 is supported by the main bearing assembly 46, which in this particular embodiment is depicted as a double taper-roller bearing (TRB) assembly. The aft "downwind" end 44 of the main shaft 36 is supported by the bearing unit 48, which in this particular embodiment is depicted as a cylindrical roller bearing (CRB) assembly. The CRB assembly 48 is fixed in the bedplate 40, and the main shaft 34 is pulled from the bedplate 40 before servicing/replacing the CRB assembly 48 in accordance with the apparatus and methods set forth herein.

As is generally understood, the main shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 60 configured to rotate each rotor blade 22 about its pitch axis 28. Further, each pitch adjustment mechanism 60 may include a pitch drive motor 68 (e.g., any suitable electric, hydraulic, or pneumatic motor), a pitch drive gearbox 62, and a pitch drive pinion 64. The pitch drive motor 68 is coupled to the pitch drive gearbox 62 to impart a mechanical force to the pitch drive gearbox 62. Similarly, the pitch drive gearbox 62 is coupled to the pitch drive pinion 64 for rotation therewith. The pitch drive pinion 64 is in rotational engagement with a pitch bearing 66 coupled between the hub 20 and a corresponding rotor blade 22 such that rotation of the pitch drive pinion 64 causes rotation of the pitch bearing 66, thereby rotating the rotor blade 22 about the pitch axis 28. Similarly, the wind turbine 10 may include one or more yaw drive mechanisms 56 communicatively coupled to the controller 26, with each yaw drive mechanism(s) 56 being configured to change the angle of the nacelle 16 relative to the wind (e.g., by engaging a yaw bearing 58 of the wind turbine 10).

Referring to FIGS. 4 through 8, an apparatus 70 is disclosed for use in removal or installation of a bearing unit 48 in the bedplate 40 of wind turbine after the main shaft 34 has been pulled from the bedplate 40. The apparatus 70 includes a frame 71 that is fixable to a downwind end 44 of the bedplate 40 adjacent to the bearing unit 48. The frame 71 may be a modular system having any number of components that can be easily erected in the field with the bedplate 40 atop the tower 12 (FIG. 1). The frame 71 is not limited by components, size, or configuration.

Cradle members 82 are mounted on the frame 71 at a location such that the bearing unit 48 can be slid out of the bedplate 40 and supported on the cradle members 82, or slid from the cradle members 82 into the bedplate 40. As mentioned above, the cradle members 82 may include various deigns. For example, in one embodiment the cradle members 82 may be designed as a continuous curved member that is fixed to a base member and has a radius to match the radius of the bearing unit 48. With this embodiment, the cradle "members" may be thought of different sections of the curved member that contact that the bearing unit 48. This curved member may be, for example, a rigid component, or a non-rigid component, such as a sling member.

In the particular embodiment described herein, the cradle members 82 are defined by separate components that are slidable (and thus adjustable) along a base member 72. Each individual cradle member 82 can have various designs or configurations. For example, in one embodiment, each cradle member may include an upper cradle section 83 having a shape to engage against an outer circular ring of the bearing unit 48, and a lower cradle base 84 that is slidable along the base member 72. The upper cradle section 83 may be formed with sloped sides as depicted in the figures, or have any other shape for engaging with the outer ring of the bearing unit 48. The cradle base 84 in the illustrated embodiment has a C-channel shape with a height offset that allows the outer ring of the bearing unit 48 to extend below the locations where the upper cradle sections 83 engage opposite sides of the bearing unit 48, as depicted in FIG. 4.

Figure 4:
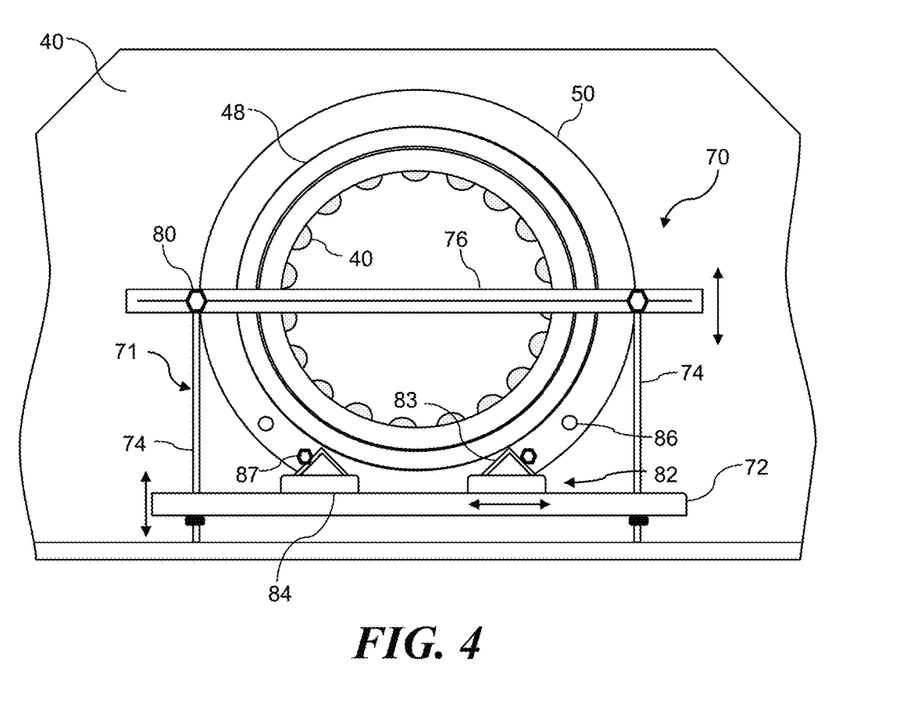
FIG. 4 is an end view at the downwind end of the bedplate depicting an embodiment of the apparatus erected for removing or installing the bearing unit in the bedplate.

As depicted in FIG. 4, the cradle members 82 are adjustable in a transverse and vertical direction along the frame 71 to accommodate bearing units 48 of varying size.

In the illustrated embodiment, the frame 71 includes the base member 72 mounted on vertical rods 74, wherein the cradle members 82 adjustable in the transverse direction along the base member 72. The cradle members are adjustable in the vertical direction via the base member 72 that is adjustable in the vertical direction along the rods 74. For example, the rods 74 may be threaded rods, and a vertical position of the base member 72 on the rods 74 can be fixed by lock nuts 73.

Figure 5:
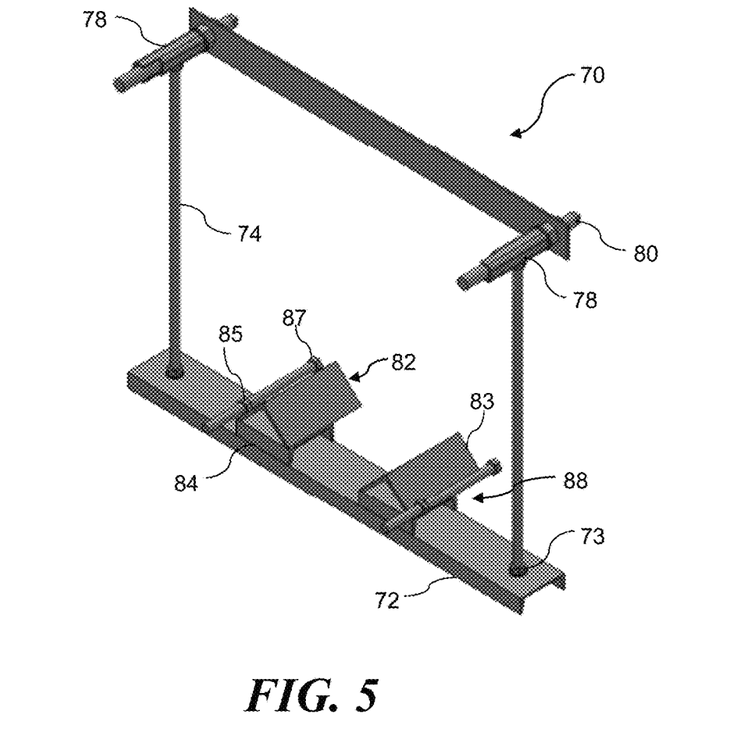
FIG. 5 is a perspective view of an embodiment of the apparatus of removing or installing the bearing unit in the bedplate.
Figure 6:
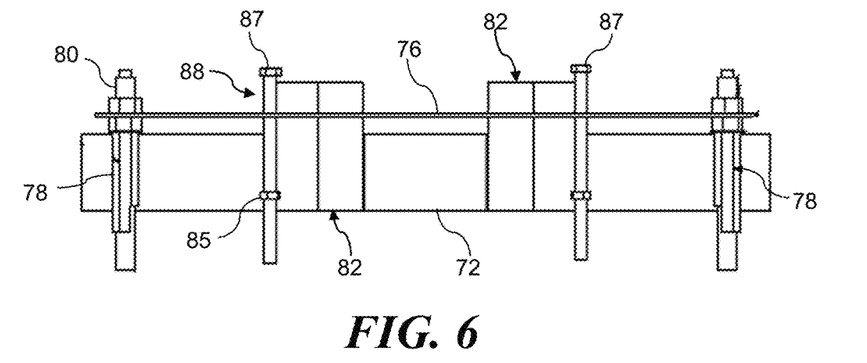
FIG. 6 is a top view of the apparatus of FIG. 5.
Figure 7:
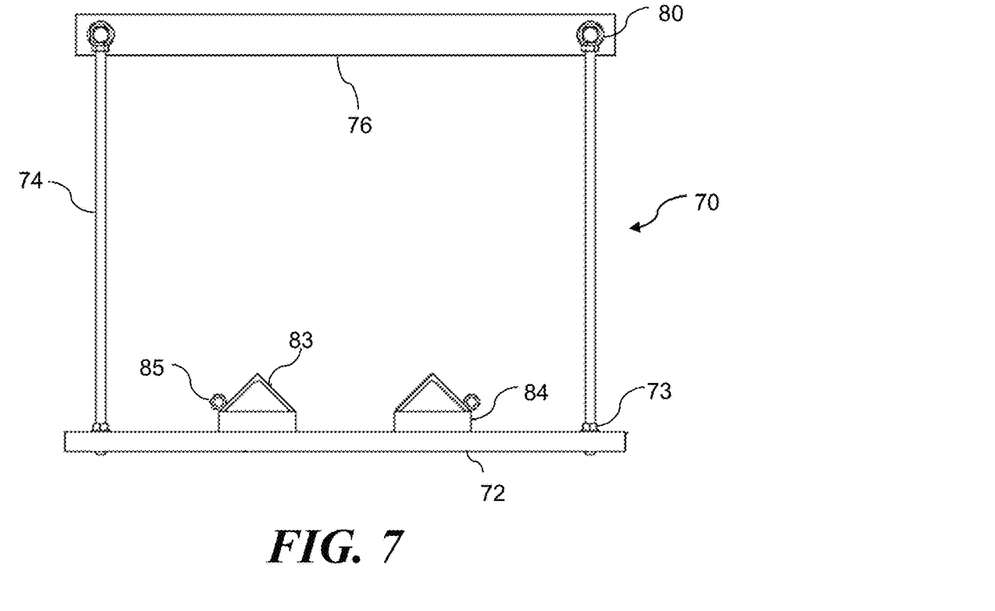
FIG. 7 is a front view of the apparatus of FIG. 5.
Figure 8:
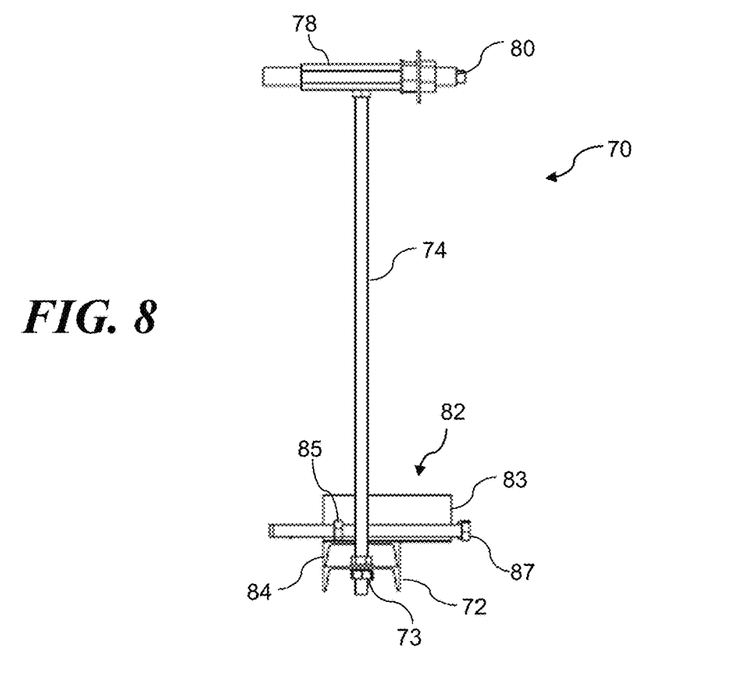
FIG. 8 is a side view of the apparatus of FIG. 5.

The base member 72 may be a beam, such as a C-channel beam as depicted in the figures.

The frame 70 may include a top cross member 76 that spans between the rods 74. This top member 76 may also be fixable to the bedplate 40. For this purpose, spacers 78 may extend transversely from a back side of the top cross member 76 and have a length so as to engage directly against the bedplate 40 or against a flange 50 fixed to the bedplate 40 around the bearing unit 48. In the illustrated embodiment, each spacer 78 has a cut-out or relief defined therein that permits the spacer to engage against a side of the flange 50, as well as directly against the bedplate 40. Bolts 80 extend through the topo cross member 76 and spacers 78 and are used to bolt the top cross member 76 to the bedplate 40. This configuration provides two locations for fixing the frame 70 to the bedplate 40 at two upper locations at opposite sides of the bearing unit 40.

The cradle members 82 may include a locking mechanism 88 that is configured to lock the cradle member at a fixed position along the base member 72. This mechanism 88 may be any conventional device, such as locking bolts or pins, spring loaded detent devices, clamps, and so forth. In a unique embodiment depicted in the figures, the locking mechanism 88 also serves the function of adjusting the axial position of the cradle member 82 as well as fixing each cradle member 82 to the bedplate 40, thereby locking the cradle member at the fixed position relative to the base member 72. The locking mechanism 88 includes a bolt 87 that extends through a nut 85 fixed (e.g., welded) to the cradle member 82 (e.g., to the upper cradle section 83), the bolt 87 having a length so as to bear against the bedplate 40 or extend into a threaded hole 86 defined in the bedplate 40 or the flange 50 attached to the bedplate 40 around the bearing unit 48. Thus, this configuration provides two additional locations for fixing the frame 70 to the bedplate 40, such locations being at opposite lower sides of the bearing unit 48.

As discussed, the present invention also encompasses various method embodiments for removing or installing a bearing unit 48 at a downwind end 44 of a bedplate 40 in the field, wherein the main shaft 34 may or may not have been previously removed from the bedplate 40. The includes various steps discussed above, including: erecting a frame 70 at a downwind end 44 of the bedplate 40 adjacent to the bearing unit 48; fixing the frame 70 to the bedplate 40; adjusting cradle members 82 on the frame 70 at a location such that the bearing unit 48 can be slid out of the bedplate 40 and supported on the cradle members 82, or supported on the cradle members 82 and pushed into the bedplate 40; and sliding the bearing unit 48 out of the bedplate 40 and onto the cradle members 82, or sliding the bearing unit 48 from the cradle members 82 into the bedplate 40.

The methods may also include adjusting the cradle members 82 on the frame 70 in a transverse and vertical direction to accommodate the bearing unit 48 prior to sliding the bearing unit 48 out of or into the bedplate 40.

The methods may include fixing the frame 70 to the bedplate 40 at two upper locations at opposite sides of the bearing unit 48, and at two lower locations at opposite sides of the bearing unit 48, as discussed above.

The methods are particularly suited for installing or removing a continuous roller bearing unit 48 fixed in the bedplate 40 adjacent the downwind end 44 of the bedplate 40, but have utility for any type of bearing unit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus for use in removal or installation of a bearing unit in a bedplate of wind turbine, the apparatus comprising:
   a frame fixable to a downwind end of the bedplate adjacent to the bearing unit;
   cradle members mounted on the frame at a location such that the bearing unit can be slid out of the bedplate and supported on the cradle members, or slid from the cradle members into the bedplate;
   the cradle members adjustable on the frame in a transverse and vertical direction to accommodate bearing units of varying size; and
   wherein the frame comprises a base member mounted on vertical rods, the cradle members adjustable in the transverse direction along the base member, and the base member adjustable in the vertical direction along the rods.

2. The apparatus as in claim 1, wherein the frame further comprises a top cross member spanning between the rods and fixable to the bedplate via spacers extending transversely from a back side of the top cross member.

3. The apparatus as in claim 2, wherein the spacers comprise a cut-out section that accommodates a flange on the bedplate that surrounds the bearing unit such that the spacers bear against the bedplate and the flange, the top cross member bolted to the bedplate with bolts through the spacers.

4. The apparatus as in claim 1, wherein the base member comprises a bottom beam that spans between the rods, the beam adjustable along the rods via nuts threaded onto the rods.

5. The apparatus as in claim 1, wherein the cradle members comprise an upper cradle section and a lower cradle base, the cradle base slidable along the base member.

6. The apparatus as in claim 5, wherein the cradle members further comprise a locking mechanism configured to lock the cradle member at a fixed position along the base member.

7. The apparatus as in claim 6, wherein the locking mechanism is configured to fix the cradle member to the bedplate at the fixed position, thereby locking the cradle member at the fixed position relative to the base member.

8. The apparatus as in claim 7, wherein the locking mechanism comprises a bolt that extends through a nut fixed to the cradle member, the bolt having a length so as to bear against or extend into a threaded hole in the bedplate or a flange attached to the bedplate around the bearing unit.

9. The apparatus as in claim 1, wherein the frame is fixable to the bedplate at two upper locations at opposite sides of the bearing unit, and at two lower locations at opposite sides of the bearing unit.

10. The apparatus as in claim 9, wherein the cradle members are adjustable along a base member of the frame and fixable to the bedplate at the two lower locations.

11. The apparatus as in claim 9, wherein the frame member comprises a top cross member configured with spacers, the top cross member boltable to the bedplate through the spacers.

12. A method for removing or installing a bearing unit at a downwind end of a bedplate in the field, the method comprising:
    erecting a frame at a downwind end of the bedplate adjacent to the bearing unit;
    fixing the frame to the bedplate;
    adjusting cradle members on the frame at a location such that the bearing unit can be slid out of the bedplate and supported on the cradle members, or supported on the cradle members and pushed into the bedplate;
    sliding the bearing unit out of the bedplate and onto the cradle members, or sliding the bearing unit from the cradle members into the bedplate; and
    wherein the frame comprises a base member mounted on vertical rods and the step of adjusting the cradle members on the frame comprises adjusting the cradle members in a transverse direction along the base member and in a vertical direction along the rods.

13. The method of claim 12, comprising fixing the frame to the bedplate at two upper locations at opposite sides of the bearing unit, and at two lower locations at opposite sides of the bearing unit.

14. The method of claim 12, wherein the bearing unit is a continuous roller bearing unit fixed in the bedplate adjacent the downwind end of the bedplate.

* * * * *